March 1, 1949.   J. J. BYBERG   2,463,085
SACKING DEVICE
Filed Sept. 4, 1945   2 Sheets-Sheet 1
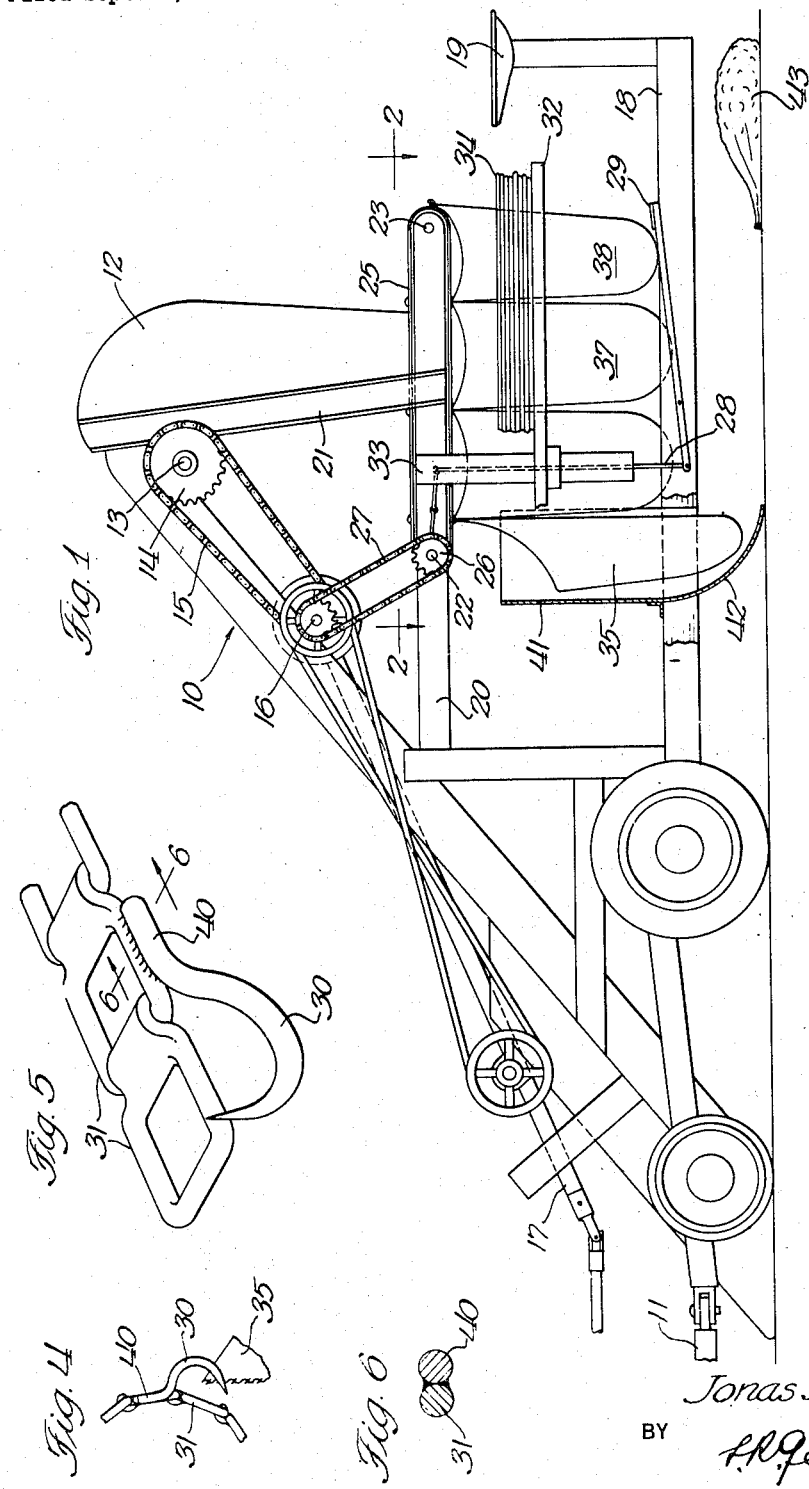
INVENTOR
Jonas J. Byberg
BY
ATTORNEY

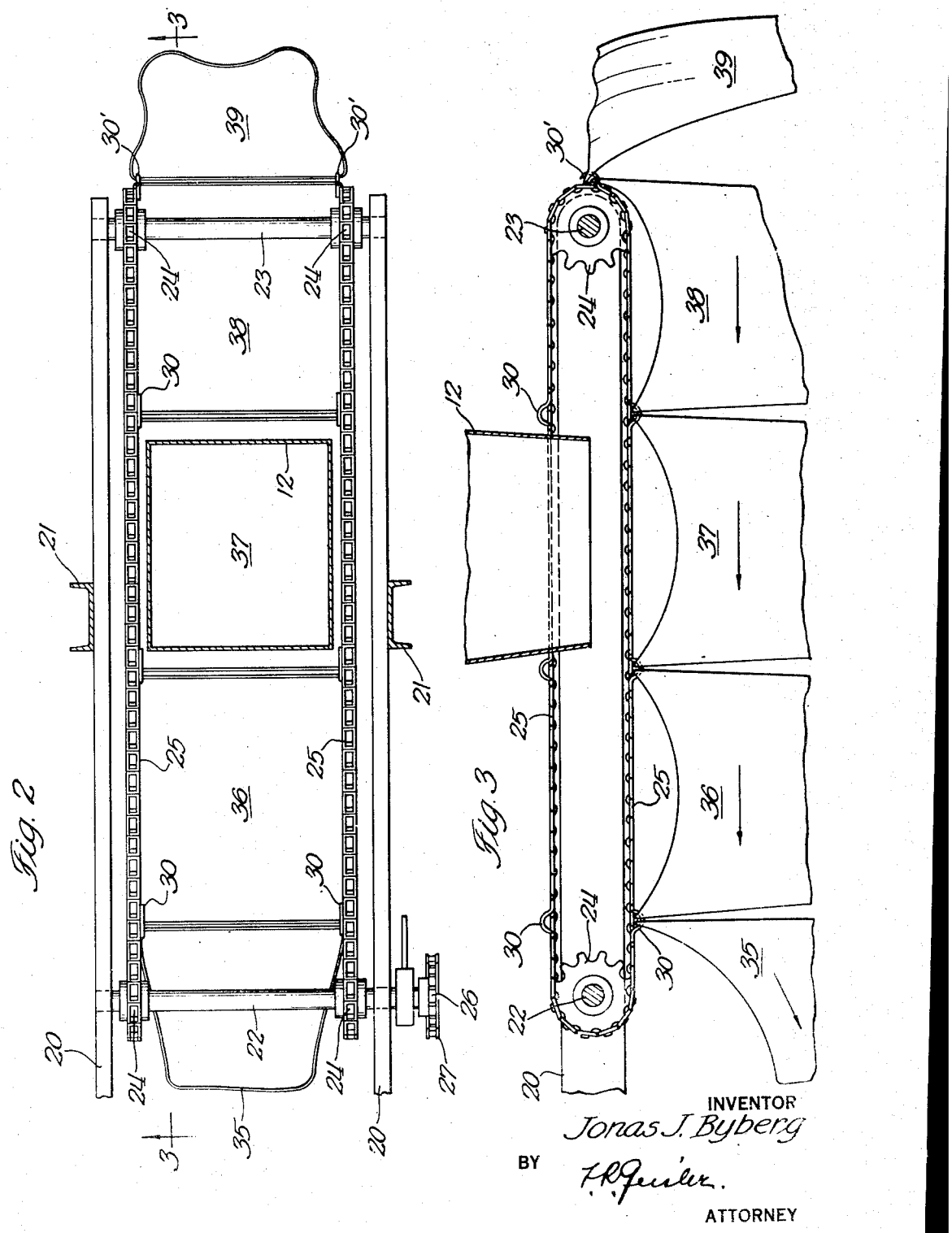
March 1, 1949.    J. J. BYBERG    2,463,085
SACKING DEVICE
Filed Sept. 4, 1945    2 Sheets-Sheet 2
INVENTOR
Jonas J. Byberg
BY
ATTORNEY Patented Mar. 1, 1949

2,463,085

UNITED STATES PATENT OFFICE 2,463,085

SACKING DEVICE

Jonas J. Byberg, Silverton, Oreg.

Application September 4, 1945, Serial No. 614,195

5 Claims. (Cl. 226—61)

This invention relates in general to sack filling machines in which empty sacks are moved into position below a discharging hopper or chute and then moved away when sufficiently filled.

This invention relates particularly to agricultural machines in which commodities, such as onions, potatoes, etc., are mechanically picked up from windrows on the ground, delivered to a suitable hopper, and then placed in sacks or bags. More specifically, this invention involves what is often described as a "chain type" sacker.

An object of this invention is to provide an improved and simplified means by which sacks can be positioned, filled and discharged in rapid succession as the machine, in its movement over the ground, picks up substantial quantity of the commodity to be sacked.

Another object of the present invention is to provide a simplified "chain type" sacker which can be operated by a single person at a high rate of speed.

A further object is to provide such a device which will not only be simple in construction but will also be compact and relatively inexpensive to manufacture.

A still further object of this invention is to provide an improved sacker for agricultural products in which the sacks, as rapidly as they are filled, will be deposited on their sides on the ground, with little or no spilling of the contents, as the machine moves ahead over the ground.

These objects and other advantages I attain by providing special sack-supporting hooks on a pair of endless chains, and by otherwise constructing my sacking machine in the manner hereinafter briefly described with reference to the accompanying drawings.

In the drawings:

Fig. 1 is a more or less diagrammatic side elevation of an agricultural "pick-up" machine with my sacking device mounted thereon;

Fig. 2 is an enlarged fragmentary plan section taken on line 2—2 of Fig. 1;

Fig. 3 is a fragmentary sectional side elevation on line 3—3 of Fig. 2;

Fig. 4 is a fragmentary side elevation of a portion of one of the endless chains showing one of the sack-supporting hooks attached thereto, the hook being shown in discharging position;

Fig. 5 is an enlarged perspective view of a couple of adjacent links of one of the chains showing a sack-supporting hook attached to one of the links; and Fig. 6 is a section on line 6—6 of Fig. 5.

Referring first to Fig. 1, 10 indicates in general an ordinary mechanical "pick-up" adapted to be attached to the rear of a tractor (not shown) by a draw bar 11. The "pick-up" includes the usual inclined frame mounted on wheels and supporting an endless conveyor belt, or "pick-up" belt, having suitable transverse carrier slats which, when brought into contact with the vegetables on the ground, conveys the vegetables to the top of the frame and discharges them into a suitable hopper 12. The conveyor belt is driven by means of a shaft 13, on the end of which a sprocket wheel 14 is attached. Sprocket wheel 14 is connected by sprocket chain 15 to a sprocket wheel attached to a shaft 16, and shaft 16 is driven through the medium of a power take-off shaft 17, to which it is connected by suitable gearing, the shaft 17 being rotated by the motor on the tractor. The conveyor belt is driven at fairly rapid speed as long as the "pick-up" is in operation. The construction thus far described is old and well known.

The bottom of the frame of the "pick-up" is extended rearwardly and includes a rigidly mounted horizontal member 18 at each side, these parallel members 18 being connected at suitable intervals by transverse braces. A seat 19 for the operator of the sacking device is mounted at the rear end of the members 18.

An upper pair of spaced horizontal frame members 20 are also rigidly secured to the main frame. Side brackets 21 connect these members 20 to the top of the main frame and also serve as supporting means for the hopper 12.

A pair of transversely-extending shafts 22 and 23 (Fig. 2) are mounted in suitable journals supported on the frame members 20. A pair of sprocket wheels 24 are mounted on each of the shafts 22 and 23 inside the frame members 20 and an endless chain 25 rides over the sprocket wheels at each side. One end of the shaft 22 is extended and an outer sprocket 26 is secured thereon. Sprocket chain 27 connects the sprocket 26 with a clutch mechanism (not shown) associated with shaft 16. The clutch mechanism is operated by means of a rod 28 connected to a foot pedal 29. The clutch mechanism is so arranged that downward pressure on the foot pedal 29 will throw in the clutch and thus cause shaft 22 to be rotated, and release of the foot pedal 29 will release the clutch thus discontinuing the rotation of shaft 22. The rotation of shaft 22 drives the two chains 25 in unison.

At equally spaced intervals along each of the chains 25 sack-holding hooks 30 are attached. These hooks are preferably sickle-shaped, as shown in Figs. 4 and 5, having a straight shank portion 40 which may be welded, or otherwise securely attached, to the side of a chain link, as illustrated in Figs. 5 and 6. These hooks are so mounted that they will be in closed position in relation to the chain links when the chain assumes a straight-line position, but will present an open hook when the chain passes around a wheel of relatively small radius, such as the end sprocket wheels 24. Thus the hook 30' shown in Fig. 3, passing around an end sprocket wheel, is in open position and pointed upwardly. It will be obvious from Fig. 3 that when the same hook passes around the sprocket wheel at the other end of the chain path the hook will then come into open position also but will be pointed downwardly instead of upwardly.

A platform 32 (Fig. 1) conveniently and adjustably mounted at one side of the sacking device, for example, adjustably clamped on a downwardly extending piece of pipe which in turn is rigidly secured to frame member 20, supports a pile of empty sacks 34 which are to be filled.

The operation of the device is as follows: The operator grabs the top sack from the pile 34 and attaches the edge of the top or open end to a hook on each of the chains when the hooks are in the position shown at 30' in Fig. 3. The sack with the edge attached to these hooks will then be in the position illustrated by the sack 39 in Fig. 3. Without releasing his hold on the sack the operator waits until the chains have moved far enough so that the next hook on each chain is in the open position formerly occupied by the hook 30', whereupon the operator attaches the opposite side or edge to the second pair of hooks. The sack will now be in the position indicated by the sack 38 in Fig. 3. While the last mentioned pair of hooks are in this position the operator grabs another sack from the pile and attaches its edge to the same hooks, and so on. When the sack, supported on four hooks is moved into place below the hopper 12, like the sack 37 of Fig. 3, it is in filling position and the vegetables delivered to the hopper 12 drop into the sack. The operator watches the filling of the sack and when it is sufficiently filled he causes the chains to move to advance the filled sack into the position shown by sack 36 in Fig. 3.

Preferably the clutch mechanism, to which the foot pedal 29 is connected, is a one-revolution clutch or similar clutch mechanism which, when actuated momentarily by foot pressure on the pedal, will cause sufficient rotation to be imparted to chain sprocket shaft 22 to advance the chains 25 a distance equal to the spacing between consecutive hooks. With such arrangement the operator is assured that with each operation of the clutch a sack will be properly positioned beneath the hopper and a pair of hooks will be in the desired open or receiving position for the rear edge of the last sack and the forward edge of a new sack to be secured thereon.

As each pair of hooks passes around the forward pair of sprocket wheels they are brought into the open discharging position illustrated in Fig. 4, and it will be apparent that in this position the edges of the sacks will slip off the hooks. In Fig. 3 the front edge of sack 35 has already left its supporting hooks, which have passed around the end sprocket, and with the next movement of the chains the rear edge of sack 35 will likewise be released together with the front edge of the next sack 36.

For the purpose of guiding the filled discharged sacks as they drop to the ground to be deposited on the ground with little or no spilling of their contents I provide a guide chute 41 (Fig. 1) having two sides and a front wall which is curved rearwardly at the bottom as indicated at 42. The curved bottom causes the sacks to slide to the ground and to come to rest on their side on the ground as indicated by the discharged filled sack 43 in Fig. 1. As the machine moves ahead over the ground the filled sacks will be left in a row on the ground to be picked up later whenever desired.

Various modifications might be made in my sacking device without departing from the principle of my invention. The device which I have described and which is illustrated in the drawings I have found to be a simple and satisfactory means of practicing my invention but it is not my intention to limit my invention otherwise than as stated in the claims.

I claim:

1. In a sacking device of the character described, a pair of endless conveyors moving in transversely spaced planes, each conveyor passing over a supporting element at each end of its path, each conveyor carrying sack-engaging members at spaced intervals, the spacing of said sack-engaging members on each of said conveyors and the transverse distance between said conveyors being such that when the mouth of a sack is attached to two sack-engaging members on each conveyor the mouth of the sack will be held open, means for delivering material to be sacked into the open mouth of a sack when so held, means for moving said conveyors, said sack-engaging members so mounted on said conveyors that when that portion of a conveyor on which one of said members is mounted passes around one of said supporting elements the sack-engaging members will be in open position with respect to the conveyor and will be in closed position with respect to the conveyor when the said portion of the conveyor is in straight line position.

2. A sacking device comprising a pair of endless chains moving in transversely spaced planes, each chain passing over a supporting element at each end of its path, each chain carrying sack-engaging members at spaced intervals, the spacing of said sack-engaging members on each of said chains and the transverse distance between said chains being such that when the mouth of a sack is attached to two sack-engaging members on each chain the mouth of the sack will be held open, means for delivering material to be sacked into the open mouth of a sack when so held, means for moving said chains, said sack-engaging members so mounted on said chains that when that portion of one of said chains to which a member is attached passes around the supporting element at an end of its path the sack-engaging member will be in open position with respect to the chain and will be in closed position with respect to the chain when the same portion of the chain is arranged in a straight line.

3. In a sacking device of the character described, a pair of endless chains mounted in substantially vertical planes, each chain passing over a supporting wheel at each end of its path, sack-supporting hooks carried by said chains at spaced intervals, the spacing of said hooks on each of said chains and the horizontal transverse distance between said chains being such that when the mouth of a sack is attached to a pair of consecutive, correspondingly arranged hooks on each chain the mouth of the sack will be held open, means for delivering material to be sacked into the open mouth of a sack when so held, means for moving said chains in unison, the arrangement of said chains and hooks being such that when said chains pass around the supporting wheels at one end of their paths the hooks passing over said latter-mentioned wheels will be up-turned and when passing around the wheels at the other end of the chain paths the hooks will be down-turned.

4. A sacking device including a discharging hopper, means for delivering material to be sacked to said hopper, a pair of endless chains mounted in substantially vertical planes near the bottom of said hopper, each chain passing over a supporting wheel at each end of its path, sack-supporting hooks carried by said chains at spaced intervals, the spacing of said hooks on each of said chains and the horizontal transverse distance between said chains being such that when the mouth of a sack is attached to a pair of consecutive, correspondingly arranged hooks on each chain the mouth of the sack will be held open, means for moving said chains in unison, a control for said chain moving means, the arrangement of said chains and hooks being such that when said chains pass around the supporting wheels at one end of their paths the hooks passing over said latter-mentioned wheels will be up-turned and when passing around the wheels at the other end of the chain paths the hooks will be down-turned, and a chute extending downwardly below said latter-mentioned end of said chain paths.

5. A sacking device including a discharging hopper, a pair of endles chains mounted in substantially vertical planes near the bottom of said hopper, each chain passing over a supporting wheel at each end of its path, sack-supporting, sickle-shaped hooks carried by said chains at equally spaced intervals, the spacing of said hooks on each of said chains and the horizontal transverse distance between said chains being such that when the mouth of a sack is attached to a pair of consecutive, correspondingly arranged hooks on each chain the mouth of the sack will be held open, means for moving said chains in unison, a control for said chain moving means, the arrangement of said chains and hooks being such that when said chains pass around the supporting wheels at one end of their paths the hooks passing over said latter-mentioned wheels will be up-turned and when passing around the wheels at the other end of the chain paths the hooks will be down-turned, and a chute extending downwardly below said latter-mentioned end of said chain paths, said chute having a wall curving at the bottom to cause a filled sack when dropped through said chute to be deposited gently on its side on the ground.

JONAS J. BYBERG.

REFERENCES CITED

The following references are of record in the file of this patent:

UNITED STATES PATENTS

| Number | Name | Date |
| --- | --- | --- |
| 1,058,747 | Hoepner | Apr. 15, 1913 |
| 1,190,898 | Hinton | July 11, 1916 |
| 1,667,930 | Edmunds | May 1, 1928 |